W. C. STEVENS.
METHOD OF MAKING TIRE CASING CARCASSES.
APPLICATION FILED SEPT. 27, 1913.
1,258,056.
Patented Mar. 5, 1918.
2 SHEETS—SHEET 2.
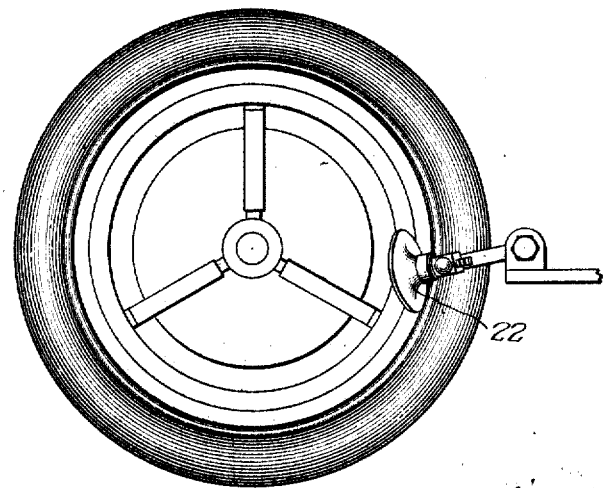
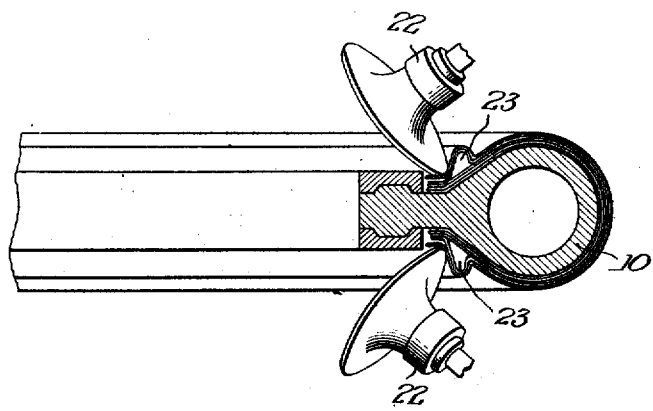

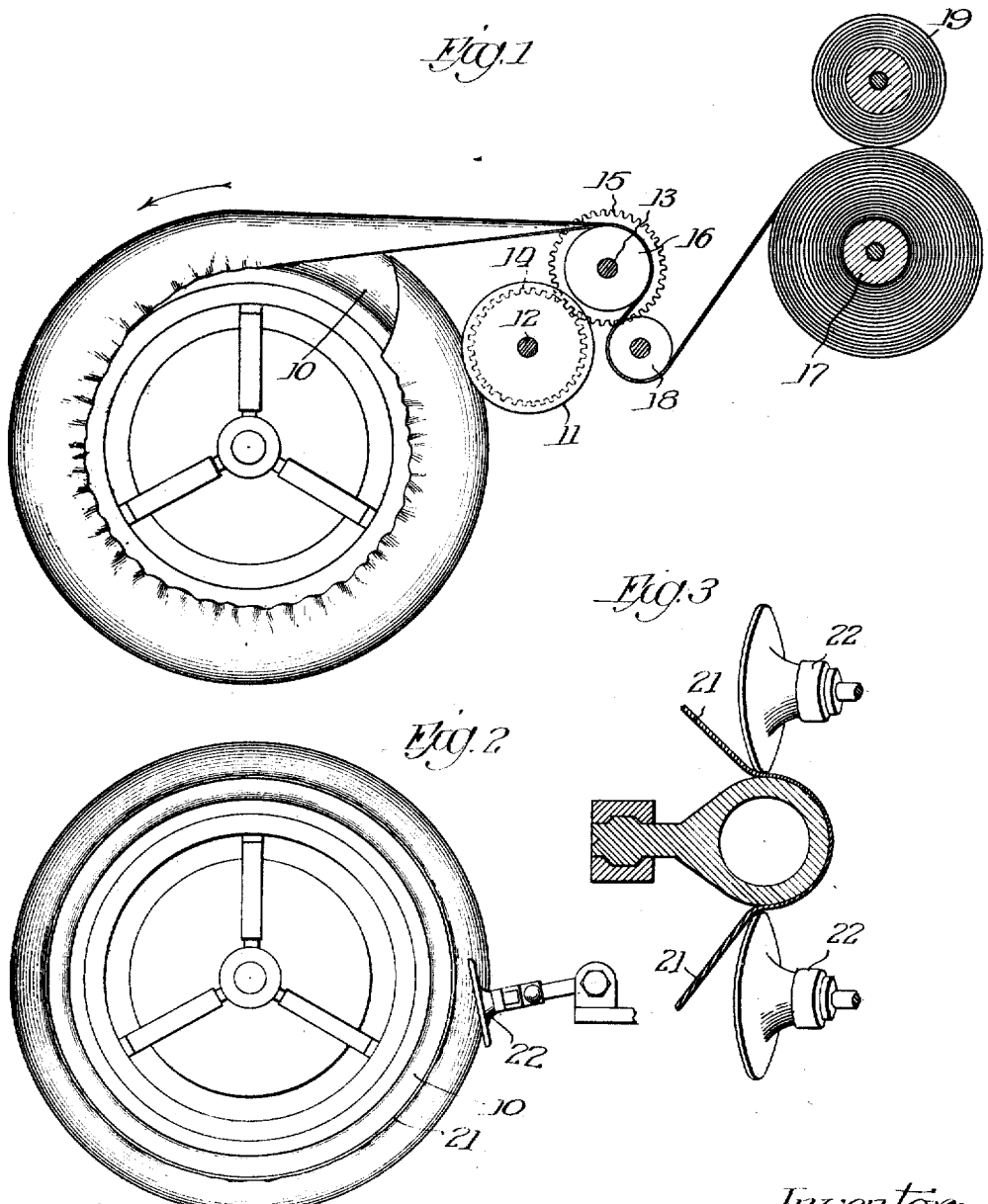

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

METHOD OF MAKING TIRE-CASING CARCASSES.

1,258,056.  Specification of Letters Patent.  Patented Mar. 5, 1918.

Application filed September 27, 1913. Serial No. 792,075.

*To all whom it may concern:*

Be it known that I, WILLIAM C. STEVENS, a citizen of the United States, residing at Akron, in the county of Summit and State of Ohio, have invented certain new and useful Improvements in Methods of Making Tire-Casing Carcasses, of which the following is a specification.

My invention relates to the art of making or shaping tire-carcasses, a tire-carcass as understood in this art being the shaped mass of rubber and fabric, which, after the addition of the tread and other parts of the tire-casing and the curing of the whole in a mold, becomes the completed tire-shoe for automobiles and similar vehicles.

Prior to my invention, such tire-carcasses have been ordinarily made by shaping successive layers or plies of material, rubber frictioned fabric, for instance, on a tire-core or form as follows: The operator applies a ply of the fabric to the periphery of the annular core, cementing it in place more or less to cause its adhesion, and stretching it during such application, as it is always cut somewhat short. He is rarely able to judge the exact amount to stretch it as a whole so he is likely to stretch it too much, in which case the ply becomes overstretched and weakened and he is compelled to cut off a portion; or, he is likely to stretch it too little, in which case he has to remove a part of the ply from the form, stretch the detached section still further, and replace it in position on the core. The effect of this latter proceeding is that the strip of the fabric is stretched irregularly, some parts more than others, and successive plies are not always stretched to the same degree. In carrying out this hand process, the workman grasps the side-portions of the ply and stretches it by pulling on such sections, which necessarily unduly elongates such side-portions, thereby rendering more difficult the subsequent absorption of the fullness in the sides of the carcass.

It has been heretofore proposed to make such tire-carcasses by machines, but in all of these devices which I am acquainted with, in order to reduce the amount of fullness of the fabric-stock which must be absorbed and cared for in the sides of the carcass, undue stretching of the tread-portion of the ply is employed, with the obvious weakening of the completed structure and an improper distortion or distribution of the threads of the fabric.

In these machine-made carcasses it has also been practically impossible to stretch the various plies of fabric to the same degree uniformly throughout their length, but in carrying out my improved process I take care that the plies are always stretched lengthwise to the same degree and uniformly throughout their entire length. I may employ any desired means for effecting the results indicated. Owing to the fact that the series of plies ordinarily vary in width, the inner ones being narrower and the outer ones wider, it is necessary to modify the pull or force exerted on the various plies because of this difference in width, in order to secure the same percentage of elongation of each, that is, the same percentage of increase over the original length. One such means for stretching the fabric in the manner indicated is shown in my co-pending application for the apparatus, Serial No. 760,615, filed April 4, 1913.

I also shape to the side faces of the core the edge-portions of the fabric in such a manner as to avoid the formation of wrinkles during the shaping-operation. This result I effect by pressure applied in a certain direction and manner which I shall proceed to detail. The pressure which is of a rubbing kind is applied along a line or plane of short but appreciable length, the direction of which is oblique to the radius of the core or to the direction of progress of the pressure, as presently to be described. This line of pressure is made to progress toward the center or axis of the core over a series of successive zones of the fabric of narrow dimensions, such series taking usually the form of a fine spiral. The radial progress of the line of pressure, is, therefore, small as compared with its circumferential progress. The fabric is thus pressed slowly down on to the core, the pressure urging the more or less radially-extending threads of the diagonal frictioned-fabric into relation of closer parallelism, thereby absorbing the fullness. For instance, if they are crowded more closely together and caused to adhere in place they maintain such a compacted condition. The effect of this is as though the cloth were fulled or shrunk a little at this place. The immediate zone of effect is narrow and this makes the adjustment of the threads gradual and accomplished with comparative facility. The influence or effect of the fulling or condensing extends beyond the immediate path of pressure somewhat into the unattached portion of the fabric, which, in this way is preliminarily or initially prepared for the pressing-agent. Thus, the threads of the fabric have been disturbed a little and are more readily moved or drawn into the compacted parallelisms heretofore referred to.

Much depends upon the kind of pressure applied and upon the manner of application. I find that the pressure should be of a smoothing or rubbing character, the rubbing-effect being carried generally but not necessarily directly centerward. The effect which I find to be best is that produced by the edge of an individual roller, such as the fabric-applying or smoothing roller of my patent application above referred to, arranged in a plane somewhat oblique to the direction of rotation of the core. The path of the roller edge on the face of the fabric is thus several times the width of the edge, and as the core turns or revolves the material is pressed, compacted, smoothed, and fulled into position in a narrow path, and this is repeated as long as the rotation of the core and the radial movement of the pressing agent brings new portions of the material under the influence of the pressing and smoothing-roller.

Briefly stated, the principal object of my improved process or method is to make a tire-carcass free from all traces of wrinkles, folds, or similar defects in the frictioned-fabric. That is to say, the formation of such defects is prevented so that they do not subsequently require elimination.

In order that those skilled in this art may have a full and complete understanding of this process or method, I have described the same in the accompanying drawings forming a part of this specification.

In these drawings:

Figure 1 illustrates the stretching of a ply of fabric on the form or core;

Fig. 2 illustrates the smoothing of the side-portions of the fabric and the application of the same to the form or core;

Fig. 3 also illustrates the manner of applying the edge-portions of the fabric to the form;

Fig. 4 shows the manner of applying one of the plies or layers of fabric over the bead, and.

Fig. 5 is a cross-sectional view illustrating the same portion of the process.

In the particular means illustrated in these drawings for carrying out my novel process, there is provided a suitably driven revoluble form or core 10, a retarding roller 11 pressed against and adapted to travel on the periphery of such form or core or ply already applied thereto, such retarding-roller 11 being mounted on a shaft 12 connected to another shaft 13 by intermeshing gears 14 and 15, shaft 13 carrying a stretching-roller 16. The rubber frictioned fabric having been previously wound up with an interposed cotton cloth liner on the supply-drum 17 has it forward end passed around an idler 18 and over the stretching-roller 16 to the core to which its advance end is cemented. Then the form or core 10 is revolved relatively slowly in the direction indicated by the arrow illustrated in Fig. 1, and the fabric ply as it is applied in this manner to the form is stretched uniformly throughout its entire length, the stretching-roller 16 being retarded in its rotation owing to the frictional engagement of the retarding-roller 11 with the form and the gearing connection between the two shafts 12 and 13, whereby a predetermined and definite stretch is given to the fabric as it is applied to the form. As the fabric unwinds from the stock-roller 17, the cotton cloth liner is automatically wound up on the drum 19. The rear end of the first ply of fabric is then disconnected from the advance end of the second ply to which it had been temporarily secured, and the end of the second ply is, for the time being, thrown back out of coöperative relation with the core and stretching-drum 16.

Then the form with the first ply stretched thereon is rotated at a higher speed, it being understood that the central portion of such ply, by the stretching operation was caused to adhere smoothly and evenly to the outer portion or face of the form, the side-sections of the ply, however, not having yet been smoothed into place on the sides of the form. During this higher speed of rotation, the side-portions 20 and 21 of the fabric are thrown out more or less by centrifugal force and during such rotation, a pair of thin disks or rollers 22, 22, yieldingly pressed toward one another are caused to engage the sides of the fabric and travel slowly inwardly toward the axis of the form, thereby applying the side-portions of the ply to the form free from wrinkles, folds, or other blemishes, the fullness being gradually and completely absorbed in the fabric, due to the compacting and condensing effect of these disks or rollers on the fabric. This is brought about due to the peculiar disposition of the rollers. They are tilted or canted slightly with respect to the direction of rotation of the form so that they work diagonally crosswise of each of the successive zones of the fabric as the rollers travel inwardly centerward of the form. Due to such diagonal or canted arrangement of the rollers they stretch each zone of fabric that they act on transversely, which facilitates a smooth application of the fabric transversely of the form or core, but this transverse stretching of the zone of fabric is also instrumental in circumferentially shortening such zone, thereby rendering its application to the form without wrinkles or defects easier. This action of the roller on the zone of fabric is not confined solely to the particular zone under the roller, but extends more or less outwardly into the unattached portions of the fabric, preliminarily shortening such unattached sections of the ply and thereby initially preparing them for application to those portions of the form of lesser circumference.

If the rollers 22 merely rolled on the fabric and traveled inwardly toward the center without being inclined to the direction of rotation of the form, that is, disposed diagonally of the zone of fabric on which they are acting, then this peculiar shortening-effect whereby the absorption of the fullness is largely secured would not be obtained. Owing to the fact that the rollers 22 yieldingly press toward the form, they readily follow the contour of the latter and apply the fabric rapidly, efficiently, and without defects.

After the first ply has been stretched on the form and its sides rolled down into place, succeeding plies are treated in the same manner, and at the proper time the beads 23, 23, are cemented into place on the opposite sides of the carcass under construction. In rolling down the succeeding plies of fabric over the beads, particularly those portions of the ply caused to adhere to the surface of the beads between their toes and heels, the angular relation of the rollers may be shifted somewhat as illustrated in Figs. 4 and 5 to more effectively travel over such abrupt surfaces, but their diagonal relation with respect to the direction of rotation of the form is maintained in all instances to secure the application of the fabric without wrinkles. In order to obtain this, it will be understood that the rollers are so disposed as to apply pressure against the face of the carcass-strip along lines oblique to the direction of progress, with the outer ends of such lines leading; otherwise the rollers would not stretch the fabric transversely of the form as is desirable. It should be observed that in carrying out this method the fullness in the fabric is effectively cared for without pushing it ahead of the roller circumferentially of the form, the roller not only literally stretching the cloth but at the same time inwardly wiping or ironing out the wrinkles and simultaneously applying the fabric to the core or underlying ply so that the fullness once absorbed in the applied ply cannot reappear.

From the above it should be clear that in accordance with my novel method each ply is individually stretched on the form and then smoothed down on the sides of the same before the next ply is stretched and applied. It should also be obvious that the fabric plies are stretched only the required amount to maintain the completed tire-shoe or casing in normal shape and with proper strength, this being possible owing to the peculiar action of the smoothing-rollers in stretching the fabric transversely and at the same time shortening it circumferentially. The result is that no wrinkles or similar blemishes are permitted to form in the fabric during the application of the side sections of the ply to the core or carcass, and, consequently there is no necessity for subsequently attempting to overcome the effects of such wrinkles, folds, or similar defects. Stated differently, I avoid the effects of and the presence of such defects in the completed tire-shoe or casing by preventing their occurrence as the fabric is smoothed down on the form rather than place reliance upon an attempted elimination of such faults after they have occurred.

In carrying out my method I am able to apply the side-portions of the plies of fabric in place on the core or carcass with facility and despatch over the entire surface from the brow or tread-portion of the core around over the bead to the inner edge or toe of the latter, and in addition, each ply before such smoothing is uniformly stretched as described, throughout its entire length so that in the complete tire-structure these various superposed plies give mutual support to one another by reason of their cumulative and uniform capacity for resistance against internal pressure.

By this process the detrimental over-stretching of the fabric hereinabove referred to, with its resulting weakening of the finished tire-casing or shoe is entirely overcome, since, as explained, it is not necessary to unduly stretch the fabric if the fullness is absorbed in the sides of the tire by this process.

I claim:

1. The method of making tire-carcasses, which consists in stretching a ply of fabric uniformly throughout its length, conforming the middle section of such ply to the shape desired, then conforming the sides of the ply to the shape required, then stretching a second ply of greater width to the same degree in the same manner over the first ply, and then conforming the sides of such second ply to the shape desired over the first ply, substantially as described.

2. The method of making tire-carcasses, which consists in stretching a ply of fabric uniformly throughout its length and simultaneously conforming the middle section of such ply to the shape desired, then conforming the sides of the ply to the required shape, then stretching a second ply of greater width to the same degree in the same manner over the first ply, and then conforming the sides of such second ply to the shape desired over the first ply, substantially as described.

3. The method of constructing tire-carcasses, which consists in stretching in succession plies of fabric of different widths each uniformly lengthwise to the same degree, conforming the middle part of each ply in succession to the shape required for it and at the same time bringing such middle part of each ply, (except the first,) into intimate adherent relation with the one beneath it, and also in the same succession shaping and smoothing the sides of each ply to the form desired by continuous pressure directed against its face and proceeding inwardly toward the inner edges of the tire, substantially as described.

4. The method of constructing tire-carcasses, which consists in stretching in succession plies of adhesive fabric of different widths, each uniformly lengthwise to the same degree, and simultaneously conforming the middle part of each ply, (except the first,) into intimate adherent relation with the one beneath it by the stretching operation, and also in the same succession shaping and smoothing the sides of each ply to the form desired by continuous pressure directed against its face and proceeding inwardly toward the inner edges of the tire, substantially as described.

5. In the art of shaping tire-carcasses, the step which consists in bringing the side-portion of a strip of fabric into conformity with the shape desired by pressure applied progressively against the face of the carcass strip along a single line oblique to the direction of the progress, the outer end of said line leading, substantially as described.

6. The art of shaping or smoothing down the edge portion of a ply of tire fabric to conform it to the shape desired which consists in applying to said portion pressure progressively in a single line oblique to the direction of progress, and causing successive portions of the ply to be subjected to the effect of said line of pressure while said line is caused to progress toward the center of the tire, substantially as described.

7. The method of shaping tire-carcasses, which consists in stretching uniformly in the direction of its length a ply of fabric, conforming said ply to the shape of the periphery of a tire carcass, then bringing the edge portions of said fabric to conformity with the side faces of the tire carcass and gradually smoothing the side-portions into position by progressive pressures applied to the faces of the tire carcass and in lines oblique to the direction of progress, said direction of progress being in the form of a spiral with a slowly decreasing radius and repeating the steps indicated with additional plies until a carcass of required thickness is formed, substantially as described.

8. The method of shaping tire carcasses, which consists in stretching uniformly in the direction of its length a ply of fabric, simultaneously conforming said ply to the shape of the periphery of a tire-carcass, then bringing the edge portions of said fabric to conformity with the side faces of the tire-carcass and gradually smoothing the side-portions into position by progressive pressures applied to the faces of the tire carcass and in lines oblique to the direction of progress, said direction of progress being in the form of a spiral with a slowly decreasing radius and repeating the steps indicated with additional plies until a carcass of required thickness is formed, substantially as described.

9. In the art of shaping tire carcasses, the step which consists in bringing the side portion of a strip of fabric into conformity with the shape desired by a progressive rubbing pressure applied against the face of the strip along a line oblique to the direction of progress, the outer end of said line of pressure leading, and the rubbing effect being applied from the outer end of said line in the direction of said line and at the same time inwardly in a spiral toward the middle of the carcass, substantially as described.

10. The method of shaping the plies of fabric of tire-carcasses, comprising stretching lengthwise the middle part of a fabric ply, conforming such middle part to the shape required, and shaping the side-portions of such ply to the desired form by applying traveling pressures progressing in a spiral from the conformed middle part of the ply forward from the edges in such manner that the succession of zones of fabric acted upon by the pressure are stretched in succession transversely and thereby contracted circumferentially, and simultaneously compacting the fabric threads of such zones lengthwise of the latter, substantially as described.

11. In the art of making tire-carcasses, the process of bringing the fabric layers to the proper shape, consisting in simultaneously stretching the fabric layers inwardly toward the center of the tire, and applying them in position; the point at which the stretching and application occur progressing spirally inward.

12. In the art of making tire-carcasses, the process of bringing the fabric layers to the proper shape, consisting in applying the center of a fabric layer about the crown of a form, the skirts being free, and then stretching the skirts of the fabric inwardly to the center of the form, and applying them to the form in their stretched condition, the stretching and application being performed in a spiral line about the sides of the form.

13. In the art of making tire-carcasses, the process of bringing the fabric to the proper shape, consisting in applying the center of a fabric layer about the crown of a form, the skirts being free, and then simultaneously stretching the skirts of the fabric inwardly to the center of the form and applying them to the form in their stretched condition, the application being performed in a spiral line on the sides of the form.

14. In the art of making tire-carcasses, the process of bringing the fabric layer to the proper shape, consisting in applying the center of a layer about the crown of a form, the skirts being free, and stretching the skirts of the fabric inwardly to the center of the form; the point at which the stretching action takes place being at the base of the skirt of the fabric and advancing spirally inward toward the center of the form, and applying them to the form in their stretched condition.

15. In the art of making tire-carcasses, the process of bringing the fabric layer to the proper shape,—consisting in stretching longitudinally and applying the center of a fabric layer about the crown of a form, the skirts of the fabric being free and unstretched, and then stretching the skirts of the fabric transversely inwardly to the center of the form; the point at which the stretching takes place being at the base of the skirts of the fabric and advancing spirally inward toward the center of the form, and applying them to the form in their stretched condition.

In witness whereof I have hereunto signed my name in the presence of two subscribed witnesses.

WILLIAM C. STEVENS.

Witnesses:
R. E. GLASS,
S. G. CARKHUFF.